Figure 1:
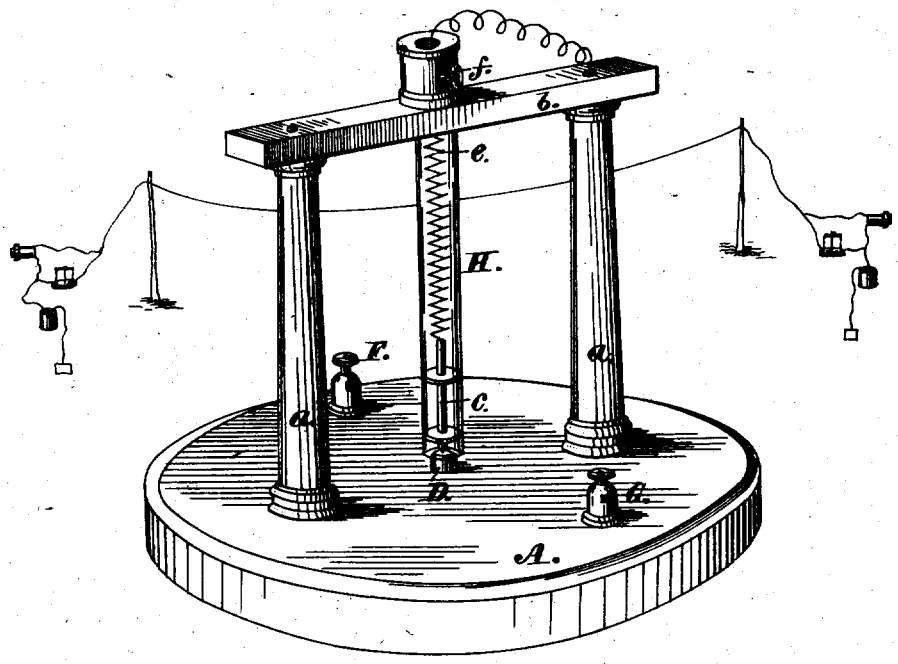

J. H. IRWIN.

TELEPHONE TRANSMITTER.

No. 10,915. Reissued Mar. 27, 1888.

Witnesses;
H. S. Hoyt Jr.
Thomas Hunt.

Inventor;
John H. Irwin,
by
J. Hindon Hyde
Atty

UNITED STATES PATENT OFFICE.

JOHN H. IRWIN, OF MORTON, PENNSYLVANIA.

TELEPHONE-TRANSMITTER.

SPECIFICATION forming part of Reissued Letters Patent No. 10,915, dated March 27, 1888.

Original No. 209,266, dated October 22, 1878. Application for reissue filed March 11, 1882. Serial No. 54,916.

*To all whom it may concern:*

Be it known that I, JOHN H. IRWIN, of Morton, in the county of Delaware and State of Pennsylvania, have invented new and useful Improvements in Acoustic Telegraphy, of which the following is a full and exact description.

This invention relates to that branch of acoustic telegraphy whereby articulate sounds produced in the vicinity of the transmitting-instrument are reproduced and made audible again at a distant point in an electrical circuit.

The object of my improvement is to transform articulate sounds into corresponding undulations in an electric current.

To this end I construct a battery-circuit with electrodes interposed in the circuit composed of any material capable of acting as a conductor of electricity. One of the electrodes is pointed and the other is blunt or flat upon its upper face. Preferably one is composed of platinum and the other of carbon. The pointed electrode is supported so that it may always have a delicate contact with the other electrode, and the degree of initial contact is regulated by a key or other device which moves or advances either of the electrodes.

The only causes of vibrations which are of interest in connection with this invention are sounds. When sound-waves fall upon the above-mentioned needles or electrodes and their supporting parts, vibrations are set up therein responsive to the exciting sound-waves. These vibrations affect the conductivity of the circuit-wire or electrode at the place of contact, and, the resistance in the circuit being thereby varied at this point, a series of undulations are set up in the electric current corresponding to the characteristics of the sound-waves, and these undulations affect a receiving-instrument at another point in the circuit and there produce similar vibrations and sounds.

My invention, then, consists, principally, in means for producing a delicate, regulated, and automatic contact of one electrode against the other—delicate to the degree that all sounds may be transmitted with the least possible loss of volume, regulated so that the proper delicacy of initial contact may be obtained, and automatic, so that it will resume the delicacy of contact required when disturbed by any electric movement.

It also consists in the employment of electrodes, one of which is composed, preferably, of platinum and the other of carbon; also, in the combination of a practically rigid sonorous body and an elastically-suspended electrode having electric contact with another electrode interposed between such body and the suspended electrode; also, in the various operative combinations of the several parts, all as more particularly hereinafter described.

That others may fully understand my invention, I will more particularly describe it, having reference to the accompanying drawings, wherein—

Figure 3:
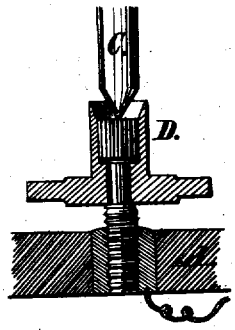
Figure 2:
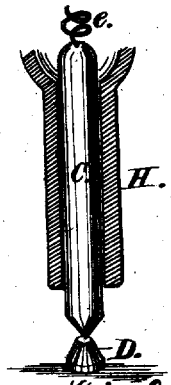
Figure 4:
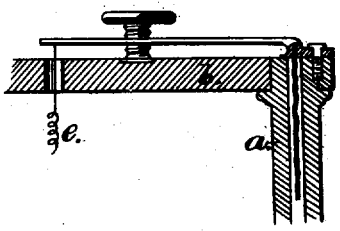

Figure 1 is a perspective view of my transmitting apparatus. Fig. 2 is a view showing a modification of the incased and guided electrode illustrated in Fig. 1. Figs. 3 and 4 show methods of bottom and top adjustment.

The apparatus hereinafter described is practically effective as set forth; but it will appear manifest that the details of the construction may be changed without affecting the essential features relating to the phenomena of variable resistance. Therefore I do not propose to confine myself to a supporting-frame of any particular form.

A is a base-piece, to which are affixed two standards, *a a*, to support a cross-bar, *b*.

C is a needle or electrode suspended from the cross-bar *b*, with its point resting upon the blunt-pointed needle or electrode D. These needles or electrodes C D may be made of any proper suitable material; but I prefer one of platinum and the other of carbon as the most efficient in effect and durable in use, the platinum needle or electrode C being pointed and the carbon electrode D being blunt or flat faced.

The contact pressure between the surface of the electrodes is of the first importance, and, as this will vary under any arbitrary adjustment, it is desirable to secure an automatic continuance of the effective adjustment as well as a regulation of the same. I therefore suspend the needle or electrode C by a small wire spring, *e*, which is attached to a turning-key, *f*, or other device, whereby the needle or electrode may be raised or lowered into the desired contact with the other electrode, and this constitutes a means for adjustment. After this adjustment is affected, the needle or electrode C automatically maintains itself in adjustment by reason of the elastic support afforded by the wire spring *e*. This spring *e* is of such size and so arranged that it does not support the whole weight of the needle or electrode C when in operative contact with the other electrode but serves by its elasticity to modify the effect of the weight of said electrode or needle with the other electrode, and thus it will be seen that the needle or electrode C automatically maintains itself in adjustment and restores itself when disturbed to adjustment, being assisted in this respect by its suspension or support in a vertical position by the guides hereinafter mentioned.

The needle C might be arranged with a supporting-spring below it, which method is not illustrated in the drawings; but it is manifest that such an arrangement would be of less delicacy than the one shown.

F and G are binding-screws for the attachment of the circuit-wires.

H is a glass tube within which the needles are incased to protect them from disturbances from air-currents. Within the tube H are guides or bearings for the needle C to keep the same central and vertical in its adjustment, because any lateral movement while in operation impairs the distinctness of the reproduced articulations.

In Fig. 3 is represented a means of adjusting the lower or carbon pencil, D, by mounting it in a cup which is provided with a screw-stem, so that by simple revolution it may be caused to rise or sink. The screw-stem should be made of brass or other good conductor, and the inclosing cup may be made of hard rubber, ivory, or other non-conductor, though this is not absolutely essential. With this arrangement the necessary delicacy of adjustment is very easily obtained.

The delicate wire spring *e* is constantly liable to elongation, and it is therefore necessary to provide an adjustment at the top. Such adjustment is secured by the key *f* or by some other well-known means, one of which is shown in Fig. 4, where a thumb-screw raises or lowers a spring-arm to which the wire is attached.

In Fig. 1 in the background there is represented a telephone-line with transmitting and receiving instruments at each end and also a battery at each end. These instruments may be duplicated and the line extended indefinitely, and the batteries all being in circuit act as relays for each other.

Having described my invention, what I claim as new, and desire to secure by Letters Patent, is—

1. In a telephonic transmitter, two electrodes in loose electric contact produced by means of gravity and a spring acting in opposition to each other, substantially as described.

2. In a telephonic transmitter, two electrodes maintained in electric contact by gravity and a spring as counteracting forces acting on one of the electrodes, the force operating in the direction of contact slightly preponderating, substantially as described.

3. In a telephonic transmitter, an electrode elastically suspended in loose electric contact with another electrode, substantially as described.

4. In a telephonic transmitter, an electrode elastically supported in loose electric contact with another electrode and provided with means for regulating the initial contact, substantially as described.

5. In a telephonic transmitter, the combination of a pointed metallic electrode resting in contact with a blunt piece of carbon, one of the electrodes being held in loose electric contact with the other electrode, substantially as described.

6. In a telephonic transmitter, the combination of a practically rigid sonorous body, an elastically-suspended electrode, and another electrode interposed between said body and the first-named electrode, substantially as described.

7. In a telephonic transmitter, the combination at the point of variable resistance of a pointed needle of platinum suspended by an elastic support and an adjustable pencil of carbon in contact therewith.

8. In a telephonic transmitter, an attenuated point in the battery circuit produced by the combination of two electrodes, one of which is suspended with its contact-point resting upon the blunt point of the other electrode with a loose adjustable pressure, substantially as described.

9. In a telephonic transmitter, the pointed electrode C, supported by a spring from an adjustable key, *f*, or its equivalent, combined with the blunt electrode D, fixed at its base, and both interposed in a battery-circuit, substantially as described.

10. In a telephonic transmitter, the pointed electrode C, suspended by a coiled spring, *e*, and adjusted by a key, *f*, in combination with the fixed electrode D and the supporting-frame, substantially as described.

11. In a telephonic transmitter, the electrode C, its supporting-spring, adjusting-key, and fixed electrode D, with the supporting-frame and a protection-case, H, substantially as described.

12. In a telephonic transmitter, the combination of the electrode C, spring *e*, electrode D, and case H, provided with internal guides for the electrode C, substantially as described.

13. In a telephonic transmitter, an electrode with its end in contact with the end of an opposite electrode with an adjustable pressure, combined with guides whereby the first-named electrode is prevented from lateral oscillations, substantially as described.

JOHN H. IRWIN.

In presence of—
F. W. HANAFORD,
A. M. PIERCE.